United States Patent [19]

Toyoda et al.

[11] 3,950,275

[45] Apr. 13, 1976

[54] METHOD OF MANUFACTURING GRANULAR DETERGENTS

[75] Inventors: Sadao Toyoda; Kuniyoshi Takenouchi, both of Funabashi; Noboru Hara, Tokyo; Fusao Kondo, Chiba, all of Japan

[73] Assignee: Lion Fat & Oil Co., Ltd., Tokyo, Japan

[22] Filed: Aug. 14, 1973

[21] Appl. No.: 388,663

[30] Foreign Application Priority Data

Aug. 17, 1972 Japan ............................... 47-81830

[52] U.S. Cl. ............. 252/527; 23/313 R; 252/89 R; 252/174; 252/539; 252/540; 252/DIG. 1; 264/117

[51] Int. Cl.$^2$... B01J 2/16; B01J 2/28; C11D 11/00; C11D 17/06

[58] Field of Search ............. 252/89, 135, 132, 134, 252/174, 527, 539, 540; 23/313; 264/117

[56] References Cited

UNITED STATES PATENTS

| | | | |
|---|---|---|---|
| 2,456,437 | 12/1948 | Miles | 252/368 |
| 3,451,935 | 6/1969 | Roald | 252/135 |
| 3,519,570 | 7/1970 | McCarty | 252/135 |
| 3,620,979 | 11/1971 | Corliss | 252/135 X |
| 3,650,967 | 3/1972 | Johnson | 252/135 |
| 3,714,051 | 1/1973 | Miles | 252/135 |
| 3,838,072 | 9/1974 | Smith | 252/540 |

FOREIGN PATENTS OR APPLICATIONS

| | | | |
|---|---|---|---|
| 510,555 | 3/1955 | Canada | 252/89 |

*Primary Examiner*—Dennis L. Albrecht
*Attorney, Agent, or Firm*—Woodhams, Blanchard & Flynn

[57] ABSTRACT

A method of manufacturing a granular detergent by spray drying a slurry of cleaning materials, which comprises: wetting the surfaces of the granules of detergent formed by spray drying; coating the thus wetted surfaces with 0.02 – 4 parts by weight of powdery builders per 1 part by weight of the granules of detergent; and drying it thereafter.

6 Claims, No Drawings

METHOD OF MANUFACTURING GRANULAR DETERGENTS

BACKGROUND OF THE INVENTION

The present invention relates to a method of manufacturing a granular detergent and its object is to provide a granular detergent having an improved mechanical strength and a low hygroscopicity.

It is admittedly possible to manufacture powdery granular detergents having a size of 8 – 100 mesh, a bulk density of 0.1 – 0.35 and a water content of 1 – 20 wt.% by spray drying a slurry of cleaning materials comprising the surfactant, builder, optical bleaching agent, etc., but a powder granular detergent of this type is generally poor in mechanical strength and possesses considerable hygroscopicity, so that the granular detergents in the prior art show a tendency to collapse partially or get wet and massive caking is apt to occur in the course of transportation or storing thereof.

In the case of West German OLS-2053177 a slurry-state detergent composition containing more than 20 wt.% of sodium silicate was granulated by means of extrusion and the like. These granular detergents were possessed of tackiness, and were covered with sodium tripolyphosphate.

However, the thus obtained granular detergents were deficient in water-solubility, and furthermore it was impossible to control the bulk density thereof.

SUMMARY OF THE INVENTION

The present invention is intended to make up for the foregoing defects of the conventional granular detergents. That is, it is intended to improve the mechanical strength of granular detergents as well as their tendency to get wet and cake by coating the surfaces of the granules of detergent formed by spray drying, with a builder. To be precise, the method of manufacturing a granular detergent under the present invention is a method of manufacturing a granular detergent by spray drying a slurry of cleaning materials, which comprises wetting the surface of the granules of detergent formed by spray drying, coating the thus wetted surfaces of the granules of detergent with powdery builders and drying it thereafter.

DESCRIPTION OF THE PREFERRED EMBODIMENTS

In the present invention, a variety of builders popular for use in synthetic detergents are applicable as the coating agents. To give examples of such builders applicable to the present invention, there are such inorganic builders as anhydrous sodium sulfate, sodium tripolyphosphate, sodium carbonate, etc. as well as such organic builders as sodium nitrilotriacetate, sodium citrate, etc. The appropriate quantity of builders to be employed as the coating agents in the present invention is generally in the range of 0.02 – 4.0 parts by weight, — preferably 0.10 – 0.50 parts by weight, — per 1 part by weight of the granules of detergent formed by spray drying. In the case when the quantity of said builders is less than 0.02 parts by weight, the granules of detergent cannot be sufficiently coated, resulting in failure to obtain a satisfactory strength of granule and to improve the hygroscopicity thereof sufficiently, while in the case where the quantity of said builders is too much, the bulk density of the product granule becomes great, and therefore, it is appropriate to make the quantity of said builders less than 4.0 parts by weight. It is of course possible to apply a mixture of two or more builders.

The control of the bulk density of the final products is possibly made by appropriately controlling the adding amount of a coating agent and the bulk density of granules of detergent obtained by means of spray drying.

The reason may be explained as below. According to the present method, a reduction of the amount of the coating agent that is added makes it readily possible to obtain final products that are low in bulk density, and contrary to this when the amount of the coating agent that is added is increased there are obtained final products that are high in the bulk density.

The coating of the granules of detergent formed by spray drying with builders require the employment of an appropriate binder. As the binder for this purpose, in addition to water only, a dilute aqueous solution of various surface active agents, CMC, water glass or the like are also applicable. Especially in the cases of such nonionic surface active agents as polyethylene glycol, CMC, water glass, etc. from which the so-called binding effect can be generally expected, the employment of a dilute aqueous solution thereof as the binder renders it possible to form a firmer coating film on the granules of detergent than that formed by employing water as the binder. The appropriate quantity of the binder to be employed for the present invention is generally in the range of 0.01 – 0.30 parts by weight, — preferably 0.10 – 0.25 parts by weight, — per 1 part by weight of the granules of detergents formed by spray drying. In the case were the quantity of said binder is less than the minimum of the foregoing general range, it is difficult to effect the coating, while in the case where it is more than the maximum of said range, it is impossible to maintain the granular shape of the detergent at the time of coating.

The coating in the present invention is performed by a known method comprising, for instance, feeding the granules of detergent formed by spray drying to an appropriate granulator such as a dish-type granulator, drum-type granulator or vibrating granulator, supplying a prescribed quantity of powdery builders while wetting the surfaces of the granules of detergent with a prescribed quantity of binder and operating the granulator at a temperature in the range of about 10° – 70°C for about 2 – 30 minutes. The granules of detergent, coating with builders as described above, are next introduced into an appropriate drying machine such as a fluidized bed dryer, air stream dryer, rotary dryer, etc. for drying, whereby a granular detergent as the final product is produced. Though the conditions for drying vary with the kind of the drying machine to be employed, it is generally appropriate to apply a temperature of from about 100° to 300°C and the time range of drying from about 1 second to 1 hour.

Hereunder will be given further particulars of the method under the present invention as well as the effect to be brought about thereby with reference to some examples embodying the present invention.

EXAMPLE

Granules of detergents formed by spray drying having the compositions shown in Table-1 below were treated by the method under the present invention.

Table - 1

| | A | B | C | D |
|---|---|---|---|---|
| | wt.% | wt.% | wt.% | wt.% |
| straight-chain alkylbenzene sodium sulfonate | 231 | — | 54.5 | 54.5 |
| α-olefin sodium sulfonate | — | 27.0 | — | — |
| sodium tripoly-phosphate | 38.5 | — | — | 15.2 |
| sodium silicate | 6.4 | 7.5 | 15.2 | 15.2 |
| sodium sulfate ($Na_2SO_4$) | 13.5 | 45.7 | 1.5 | 1.5 |
| soda ash ($Na_2CO_3$) | 6.4 | 7.5 | 15.2 | — |
| optical bleaching agent | 0.6 | 0.8 | 1.5 | 1.5 |
| CMC | 1.0 | 1.5 | 3.0 | 3.0 |
| water | 10.2 | 10.0 | 9.1 | 9.1 |

By feeding each of the thus treated granules of detergent to a drum-type granulator, coating the granules of detergent by the use of a variety of binders such as water and aqueous solution of straight-chain alkylbenzene sodium sulfonate (LAS), CMC, polyethylene glycol (PG), etc. and a variety of builders such as sodium sulfate, sodium tripolyphosphate, sodium carbonate. etc. and then introducing the thus coated granules of detergent into a fluidized bed dryer for drying, there were obtained a variety of granular detergents as the products. The conditions for coating, conditions for drying and properties of granular detergents as the products were as shown in Table-2 below. In this context, the quantity of the binder as well as the builder employed is expressed in terms of parts by weight thereof per 1 part by weight of the granules of detergent. The comparative example in Table-2 relates to the granules of detergent formed by spray drying and not subjected to the coating treatment, and the composition of granules of this detergent and the composition of those final products falling under A, B and C in said table are practically the same with the exception that the organic surfactant employed in B is different.

Table - 2

| | Comparative Example | A | B | C | D |
|---|---|---|---|---|---|
| kind of binder and applied quantity thereof | — | 3% LAS 0.26 | water 0.15 | 1% CMC 0.25 | 5% PG 0.27 |
| kind of builder and applied quantity thereof | — | sodium sulfate 0.26 | sodium tripoly-phosphate 0.45 | sodium sulfate 0.91 | sodium sulfate 0.91 |
| | | | | sodium tripoly-phosphate 0.91 | sodium tripoly-phosphate 0.76 |
| conditions for coating | — | 20°C, 5min. | 20°C, 5min. | 20°C, 5min. | 25°C, 8min. |
| conditions for drying | — | 200°C,10sec. | 200°C,10sec. | 200°C,10sec. | 180°C,15sec. |
| destruction resistivity* | 0.270 | 0.270 | 0.270 | 0.270 | 0.270 |
| (change in bulk density) | 0.300 | 0.272 | 0.276 | 0.275 | 0.272 |
| solidification property** | 20% | 4% | 2% | 3% | 2% |
| angle of repose | 40.0° | 37.5° | 37.0° | 37.0° | 37.0° |

(Remarks) *The destruction resistivity was evaluated through the procedure comprising putting the sample in a wooden box (4 cm × 10 cm × 20 cm) having smooth inner surfaces to the extent of 80% of the capacity thereof, subjecting the box to 15 minutes' vertical vibration at the rate of 100 rounds per minutes and observing the change in bulk density of the sample contained therein. In the figures pertaining to the bulk density in the table, the upper figure indicates the bulk density before the test and the lower one indicates the bulk density after the test.

**The caking property was evaluated through the procedure comprising leaving the sample standing for 24 hours in the atmosphere having the relative humidity of 95% and the temperature of 30°C, passing it through a 4-mesh sieve and estimating the quantity of the residue on the sieve in terms of wt.%.

What is claimed is:

1. A process of preparing a granular detergent having improved resistance to powdering and reduced hygroscopicity, which comprises the steps of: wetting the surfaces of spray-dried detergent granules with a liquid binder selected from the group consisting of water and dilute aqueous solutions of a binder substance selected from the group consisting of surface active agent, carboxymethylcellulose and water glass, said liquid binder being applied in an amount of from 0.01 to 0.30 parts by weight per one part by weight of said granules; coating the thus-wetted surfaces of said granules with only a powdered builder substance selected from the group consisting of anhydrous sodium sulfate, sodium tripolyphosphate, sodium carbonate, sodium nitrilotriacetate, sodium citrate and mixtures thereof, the amount of said builder substance coated on said granules being from 0.02 to 4.0 parts by weight per one part by weight of said granules, said powdered builder substance being the sole material applied on said wetted surfaces of said granules; and then drying the thus-formed coated granules at a temperature of from 100° to 300°C.

2. A process according to claim 1 in which the amount of said powdered builder substance is from 0.1 to 0.5 parts by weight per one part by weight of said granules.

3. A process according to claim 2 in which the amount of said liquid binder is from 0.10 to 0.25 parts by weight per one part by weight of said granules.

4. A process according to claim 3 in which said liquid binder and said powdered builder substance are applied to said granules in a granulator operating at a temperature of from 10° to 70°C for from 2 to 30 minutes.

5. A process according to claim 4 wherein the duration of said drying step is from 1 second to 1 hour.

6. A process according to claim 1 in which said surface active agent is selected from the group consisting of sodium straight-chain alkylbenzene sulfonates and polyethylene glycol.

* * * * *